(12) United States Patent
Dai (10) Patent No.: US 10,335,990 B2
(45) Date of Patent: Jul. 2, 2019

(54) COMPOSITE FLOOR AND MANUFACTURING METHOD THEREOF

(71) Applicant: ZHEJIANG KINGDOM PLASTICS INDUSTRY CO., LTD., Jiaxing (CN)

(72) Inventor: Huibin Dai, Jiaxing (CN)

(73) Assignee: ZHEJIANG KINGDOM PLASTICS INDUSTRY CO., LTD., Jiaxing (CN)

( * ) Notice: Subject to any disclaimer, the term of this patent is extended or adjusted under 35 U.S.C. 154(b) by 0 days.

(21) Appl. No.: 15/705,292

(22) Filed: Sep. 15, 2017

(65) Prior Publication Data

US 2019/0001543 A1 Jan. 3, 2019

Related U.S. Application Data

(63) Continuation of application No. PCT/CN2017/097570, filed on Aug. 15, 2017.

(30) Foreign Application Priority Data

Jun. 28, 2017 (CN) .......................... 2017 1 0509380

(51) Int. Cl.
  *B29B 7/00* (2006.01)
  *B32B 5/18* (2006.01)
  (Continued)

(52) U.S. Cl.
  CPC .......... *B29C 48/0011* (2019.02); *B29B 7/002* (2013.01); *B29C 48/21* (2019.02);
  (Continued)

(58) Field of Classification Search
  CPC .............. B29C 47/004; B29C 47/0042; B29C 47/0059; B29C 47/04; B29C 47/26;
  (Continued)

(56) References Cited

U.S. PATENT DOCUMENTS

2008/0010930 A1 1/2008 Mao

FOREIGN PATENT DOCUMENTS

| CN | 105908946 A | 8/2013 |
|----|-------------|--------|
| CN | 103526911 A | 1/2014 |

(Continued)

OTHER PUBLICATIONS

"Canadian Application No. 2979240, Office Action dated Oct. 2, 2018", (Oct. 2, 2018), 6pgs.

(Continued)

*Primary Examiner* — Stella K Yi
(74) *Attorney, Agent, or Firm* — Schwegman Lundberg & Woessner, P.A.

(57) ABSTRACT

A composite floor comprises a coextrusion layer compression molded using a coextrusion process. The layer comprises a first stone-plastic layer, a stone-plastic foaming layer, and a second stone-plastic layer sequentially arranged from top to bottom. The stone-plastic foaming layer is used as the main material layer, which reduces a whole weight of the floor; and the first stone-plastic layer and the second stone-plastic layer are arranged at two sides of the stone-plastic foaming layer, respectively, so that the composite floor is more stable. It is more environmentally friendly and simple in manufacturing to use the coextrusion process for compression molding by avoiding bonding using glue. Use of the coextrusion process makes various layers bond more compact, with little delamination and warpage due to effect of environmental changes. The composite floor has a low expansion rate and shrinkage rate, excellent in performance and long in service life.

11 Claims, 1 Drawing Sheet

(51) Int. Cl.
  *B29C 48/00* (2019.01)
  *B29C 48/21* (2019.01)
  *B29K 27/06* (2006.01)
  *B29L 31/00* (2006.01)
  *B32B 27/20* (2006.01)
  *B32B 27/30* (2006.01)
  *E04F 15/08* (2006.01)
  *E04F 15/10* (2006.01)
  *B29C 48/793* (2019.01)
  *B29K 105/16* (2006.01)

(52) U.S. Cl.
  CPC .............. *B29C 48/793* (2019.02); *B32B 5/18* (2013.01); *B32B 27/20* (2013.01); *B32B 27/304* (2013.01); *E04F 15/08* (2013.01); *E04F 15/102* (2013.01); *E04F 15/107* (2013.01); *B29K 2027/06* (2013.01); *B29K 2105/16* (2013.01); *B29L 2031/732* (2013.01); *B32B 2264/108* (2013.01); *B32B 2266/0235* (2013.01); *B32B 2305/022* (2013.01); *B32B 2305/30* (2013.01); *B32B 2327/06* (2013.01); *B32B 2471/00* (2013.01)

(58) Field of Classification Search
  CPC ... B29C 47/261; B29C 47/263; B29C 47/266; B29C 47/30; B29C 47/56; B29C 47/065; B29C 47/786; B29B 7/002; B32B 5/18; B32B 27/20; B32B 27/304; E04F 15/08; E04F 15/107
  See application file for complete search history.

(56) References Cited

FOREIGN PATENT DOCUMENTS

| | | |
|---|---|---|
| CN | 103897299 A | 7/2014 |
| CN | 106836712 A | 6/2017 |
| DE | 19619813 A1 | 11/1997 |
| DE | 69906527 | 5/2003 |

OTHER PUBLICATIONS

"Chinese Application No. 201710509380,5, Office Action dated Oct. 9, 2018", (Oct. 9, 2918), 9 pgs.
"German Application No. 10 2017 118 685.9, Examination Report dated Feb. 15, 2018", (Feb. 15, 2018), 12 pgs.
"International Application No. PCT/CN2017/097570, International Search Report and Written Opinion daated Mar. 23, 2018", (Mar. 23, 2018), 11 pgs.

COMPOSITE FLOOR AND MANUFACTURING METHOD THEREOF

CROSS REFERENCE TO RELATED APPLICATIONS

This application is a continuation of PCT/CN2017/097570 filed Aug. 15, 2017, which claims priority to CN 201710509380.5 filed Jun. 28, 2017, both of which are incorporated herein by reference.

BACKGROUND OF THE INVENTION

Field of the Invention

The present invention relates to the field of floor technologies, and more particularly, to a composite floor and a manufacturing method thereof.

Description of the Related Art

A polyvinyl chloride (PVC) floor is the floor manufactured by using polyvinyl chloride as the major raw material and adding auxiliary materials such as fillers, plasticizers, stabilizers, colorants and so on. Ordinary PVC floor has multilayer structures, generally including a wear-resistant layer, a printing film layer, a medium material layer, a base material layer, etc. According to the materials of the main layers, PVC floors are divided into wood-plastic floors and stone-plastic floors. The medium material layer and the base material layer of the stone-plastic floor often adopt stone powder and PVC as the main materials, which are relatively large in density, and thus the floor is relatively heavy in weight, making the use of the floor inconvenient. The medium material layer of the wood-plastic floor generally adopts wood dusts and PVC as the main materials. Therefore, the whole weight of the wood-plastic floor is relatively light. Further, the base material generally adopts the wood dusts as the main materials, thereby achieving a muting effect. Layers of the existing wood-plastic floor generally are bonded with glue, which is prone to insecure bonding, leading to complex manufacturing process and higher labor cost. During the using process, as affected by the temperature and humidity of the environment, the glue between each layer is liable to losing efficacy and coming off. Furthermore, the wood-plastic floor is not high-temperature resistant, and it begins to warp when the temperature is above 50° C. Warpage≥2 mm makes the floor unable to be used continually and results in a short service life.

BRIEF SUMMARY OF THE INVENTION

To solve the above problems, an objective of the present invention is to provide a composite floor and a manufacturing method thereof. The composite floor is light in weight, high-temperature resistant, less liable to delaminate, less liable to warp and long in service life.

To achieve the above objective, the present invention provides a composite floor, including a coextrusion layer compression moulded by using a coextrusion process. The coextrusion layer includes a first stone-plastic layer, a stone-plastic foaming layer, and a second stone-plastic layer sequentially arranged from top to bottom.

In an embodiment of the present invention, the first stone-plastic layer and the second stone-plastic layer may be made from identical materials. The first stone-plastic layer may be mainly made from following raw materials of parts by weight: polyvinyl chloride (PVC) 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, polyethylene wax 0.6-0.8 parts by weight, and carbon black 0.25-0.35 parts by weight.

In an embodiment of the present invention, the first stone-plastic layer may be mainly made from following raw materials of parts by weight: polyvinyl chloride 75 parts by weight, calcium carbonate 150 parts by weight, calcium-zinc stabilizer 7 parts by weight, chlorinated polyethylene 5 parts by weight, stearic acid 0.5 parts by weight, acrylic resin 1.5 parts by weight, carbon black 0.3 parts by weight, and polyethylene wax 0.7 parts by weight.

In an embodiment of the present invention, the stone-plastic foaming layer may be mainly made from following raw materials of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethylene wax 0.1-0.2 parts by weight.

In an embodiment of the present invention, the stone-plastic foaming layer may be mainly made from following raw materials of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.2 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 3 parts by weight, and high-density oxidized polyethylene wax 0.15 parts by weight.

The present invention further provides a manufacturing method of a composite floor, including following steps:

S1: respectively mixing raw materials of a stone-plastic layer and raw materials of a stone-plastic foaming layer;

S2: preheating the mixed raw materials of the stone-plastic foaming layer through a plurality of heating zones, temperature of the plurality of the heating zones being first reduced and then increased in sequence, a final temperature being 160-190° C.; and simultaneously preheating the mixed raw materials of the stone-plastic layer through a plurality of heating zones, temperature of the plurality of the heating zones being first reduced and then increased in sequence, and a final temperature being 160-190° C.;

S3: extruding the preheated raw materials of the stone-plastic foaming layer into a layer, and extruding the preheated raw materials of the stone-plastic layer into two layers, namely a first stone-plastic layer and a second stone-plastic layer, the first stone-plastic layer being extruded above the stone-plastic foaming layer, the second stone-plastic layer being extruded beneath the stone-plastic foaming layer, and the first stone-plastic layer, the stone-plastic foaming layer, and the second stone-plastic layer forming a coextrusion layer semi-finished product; and S4: moving the coextrusion layer semi-finished product to be between a pair of oppositely-arranged pressing rollers for compression moulding, a temperature of the pressing rollers ranging from 180° C. to 210° C., and a space between the pair of the pressing rollers being 0.7 mm-1.3 mm subtracted from a thickness of the coextrusion layer semi-finished product.

In an embodiment of the present invention, a movement speed of the coextrusion layer semi-finished product may range from 0.5 m/min to 1.5 m/min.

In an embodiment of the present invention, a preheating process of the raw materials of the stone-plastic foaming layer may go through five heating zones in sequence, and temperature of the five heating zones may be as below, respectively: a first zone 175-205° C., a second zone 170-205° C., a third zone 155-185° C., a fourth zone 150-180° C., and a fifth zone 160-190° C. A preheating process of the raw materials of the stone-plastic layer may go through five heating zones in sequence, and temperature of the five heating zones may be as below, respectively: a first zone 175-205° C., a second zone 170-205° C., a third zone 155-185° C., a fourth zone 150-180° C., and a fifth zone 160-190° C.

In an embodiment of the present invention, the raw materials of the stone-plastic layer may be mainly composed of following constituents of parts by weight: polyvinyl chloride 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, polyethylene wax 0.6-0.8 parts by weight, and carbon black 0.25-0.35 parts by weight.

In an embodiment of the present invention, the raw materials of the stone-plastic foaming layer may be mainly composed of following constituents of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethlene wax 0.1-0.2 parts by weight.

Compared with the prior art, beneficial effects of this technical solution are as below.

In the composite floor of the present invention, the stone-plastic foaming layer is used as the main material layer, which reduces the whole weight of the floor; and the first stone-plastic layer and the second stone-plastic layer are arranged at two sides of the stone-plastic foaming layer, respectively, so that the composite floor is more stable in performance. It is more friendly to environment and simple in manufacturing procedure to adopt the coextrusion process for compression moulding because of avoiding bonding using glue. Use of the coextrusion process makes various layers bond more compact, and little delamination and warpage due to effect of environmental changes may occur. Furthermore, the composite floor of the present invention is low in expansion rate, low in shrinkage rate, excellent in performance and long in service life.

DETAILED DESCRIPTION OF THE INVENTION

The technical solutions of the present invention are described clearly and completely below by means of specific embodiments and with reference to the accompanying drawings.

Figure 1:
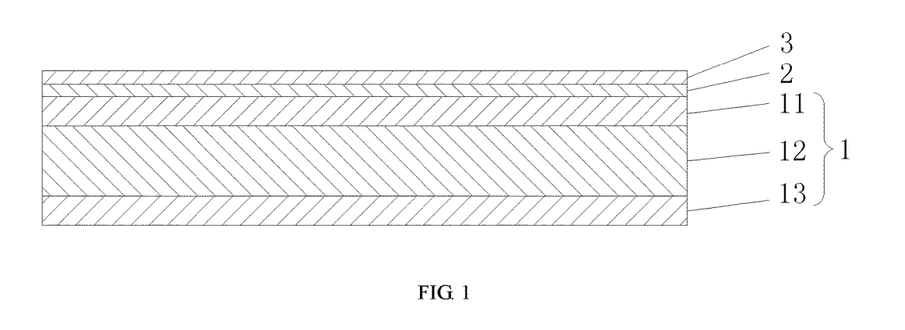
FIG. 1 is a schematic structural diagram of a composite floor according to an embodiment of the present invention.

Referring to FIG. 1, the present invention provides a composite floor, which includes a coextrusion layer 1 compression moulded by using a coextrusion process. The coextrusion layer 1 includes a first stone-plastic layer 11, a stone-plastic foaming layer 12, and a second stone-plastic layer 13 sequentially arranged from top to bottom. The "stone-plastic layer" refers to a layer structure made by using calcium carbonate and polyvinyl chloride as main raw materials. The "stone-plastic foaming layer" refers to a layer structure made by using calcium carbonate and polyvinyl chloride as main raw materials and adding foam materials. Adding the foam materials may reduce the density of products having the same volume, and thus may reduce the whole weight of the products. The first stone-plastic layer 11 and the second stone-plastic layer 13 clamp the stone-plastic foaming layer 12 from two sides of the stone-plastic foaming layer 12, respectively, which is beautiful in appearance and may change a surface hardness of the composite floor. The stone-plastic layers (namely, the first stone-plastic layer 11 and the second stone-plastic layer 13) are arranged on and beneath the stone-plastic foaming layer 12, which may play a role of balance and improve the overall stability of products.

In an embodiment, the composite floor further includes a printing film layer 2 and a wear-resistant layer 3. The printing film layer 2 is arranged on the first stone-plastic layer 11, and the wear-resistant layer 3 is arranged on the printing film layer 2. The printing film layer 2 is used for printing decorative patterns so that the composite floor is more beautiful. The wear-resistant layer 3 is made from wear-resistant materials, which may reduce wear of the composite floor and prolong the service life.

The first stone-plastic layer 11 and the second stone-plastic layer 13 are made from the same materials. The first stone-plastic layer is mainly made from following raw materials of parts by weight: polyvinyl chloride 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, carbon black 0.25-0.35 parts by weight, and polyethylene wax 0.6-0.8 parts by weight.

The stone-plastic foaming layer is mainly made from following raw materials of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethylene wax 0.1-0.2 parts by weight. The internal lubricant for PVC uses polyhydroxy alcohol fatty acid ester of Type SP60. The external lubricant for PVC uses acrylic polymers of Type ZB175. The azodicarbonamide is a yellow foaming agent, the nitroso-salt derivative is a white foaming agent, and the foam control agent adopts an acrylic processing aid. In the present invention, both the two foaming agents are used, and the foam control agent is used for regulation, which not only may ensure a high foaming rate of mixing the raw materials, but also may guarantee normal product color and luster without color cast.

The manufacturing method of the above composite floor includes following steps:

S1: respectively mixing the raw materials of the stone-plastic layer and the raw materials of the stone-plastic foaming layer. The raw materials of the stone-plastic layer are mainly composed of following constituents of parts by weight: polyvinyl chloride (PVC) 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, carbon black 0.25-0.35 parts by weight, and polyethylene wax 0.6-0.8 parts by weight. The raw materials of the stone-plastic foaming layer are mainly composed of following constituents of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethylene wax 0.1-0.2 parts by weight.

S2: preheating the mixed raw materials of the stone-plastic foaming layer through a plurality of heating zones, temperature of the plurality of heating zones being first reduced and then increased in sequence, a final temperature being 160-190° C.; and simultaneously preheating the mixed raw materials of the stone-plastic layer through a plurality of heating zones, temperature of the plurality of heating zones being first reduced and then increased in sequence, and a final temperature being 160-190° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product 1'.

Figure 2:
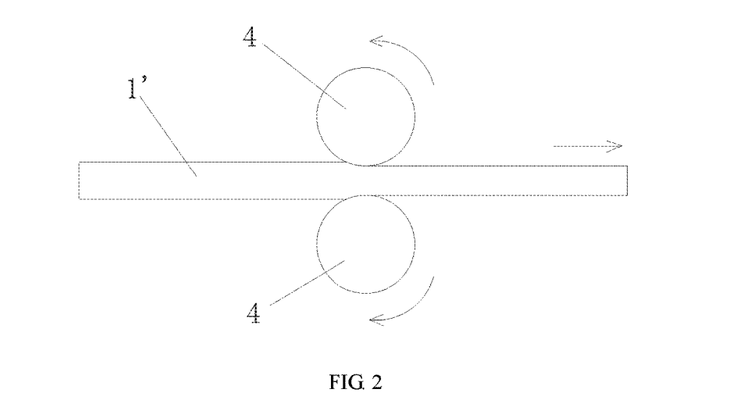
FIG. 2 is a schematic diagram of extruding a coextrusion layer semi-finished product by a pair of pressing rollers in a manufacturing process of the composite floor according to an embodiment of the present invention.

S4: moving the coextrusion layer semi-finished product 1' to be between a pair of oppositely-arranged pressing rollers 4 for compression moulding. A movement speed of the coextrusion layer semi-finished product 1' ranges from 0.5 m/min to 1.5 m/min. Under the movement of the coextrusion layer semi-finished product 1', the pair of pressing rollers 4 rotate to extrude the coextrusion layer semi-finished product 1', as shown in FIG. 2. A temperature of the pressing rollers ranges from 180° C. to 210° C., and a space between the pair of pressing rollers is 0.7 mm-1.3 mm subtracted from a thickness of the coextrusion layer semi-finished product.

The coextrusion layer 1 is obtained after the coextrusion layer semi-finished product 1' is compression moulded in Step S4. Next, the printing film layer 2 and the wear-resistant layer 3 are applied to the coextrusion layer 1, and the composite floor may be obtained by compression moulding by another pair of pressing rollers.

A product of a predetermined length and width may be obtained by cutting the composite floor. Leftover materials may be generated in the cutting process. The leftover materials are smashed and added into new raw material constituents to produce new composite floor products. That is, the leftover materials may be recycled. Thus the present invention is energy-saving and environmentally-friendly.

Specific embodiments are as below.

Embodiment 1

A composite floor includes a wear-resistant layer, a printing film layer, a first stone-plastic layer, a stone-plastic foaming layer, and a second stone-plastic layer sequentially arranged from top to bottom. The first stone-plastic layer, the stone-plastic foaming layer, and the second stone-plastic layer are compression moulded using a coextrusion process. The first stone-plastic layer and the second stone-plastic layer are mainly made from following raw materials of parts by weight: polyvinyl chloride 70 parts by weight, calcium carbonate 140 parts by weight, calcium-zinc stabilizer 6 parts by weight, chlorinated polyethylene 4 parts by weight, stearic acid 0.35 parts by weight, acrylic resin 1 parts by weight, carbon black 0.25 parts by weight, and polyethylene wax 0.6 parts by weight. The stone-plastic foaming layer is mainly made from following raw materials of parts by weight: polyvinyl chloride 95 parts by weight, calcium carbonate 95 parts by weight, calcium-zinc stabilizer 3 parts by weight, internal lubricant for PVC 0.3 parts by weight, polyethylene wax 0.15 parts by weight, azodicarbonamide 0.15 parts by weight, nitroso-salt derivative 0.45 parts by weight, foam control agent 3 parts by weight, external lubricant for PVC 0.5 parts by weight, chlorinated polyethylene 2 parts by weight, styrene acrylic polymer 2.5 parts by weight, and high-density oxidized polyethylene wax 0.1 parts by weight.

The above manufacturing method of the composite floor includes following steps:

S1: respectively mixing the raw materials of the stone-plastic layer and the raw materials of the stone-plastic foaming layer, wherein the raw materials of the stone-plastic layer are mainly composed of following constituents of parts by weight: polyvinyl chloride 70 parts by weight, calcium carbonate 140 parts by weight, calcium-zinc stabilizer 6 parts by weight, chlorinated polyethylene 4 parts by weight, stearic acid 0.35 parts by weight, acrylic ester 1 parts by weight, carbon black 0.25 parts by weight, and polyethylene wax 0.6 parts by weight. The raw materials of the stone-plastic foaming layer are mainly composed of following constituents of parts by weight: polyvinyl chloride 95 parts by weight, calcium carbonate 95 parts by weight, calcium-zinc stabilizer 3 parts by weight, internal lubricant for PVC 0.3 parts by weight, polyethylene wax 0.15 parts by weight, azodicarbonamide 0.15 parts by weight, nitroso-salt derivative 0.45 parts by weight, foam control agent 3 parts by weight, external lubricant for PVC 0.5 parts by weight, chlorinated polyethylene 2 parts by weight, styrene acrylic polymer 2.5 parts by weight, and high-density oxidized polyethlene wax 0.1 parts by weight.

S2: preheating the mixed raw materials of the stone-plastic foaming layer through five heating zones, and temperature of the five heating zones being as below: a first zone 190° C., a second zone 185° C., a third zone 170° C., a fourth zone 165° C., and a fifth zone 175° C. Simultaneously, the mixed raw materials of the stone-plastic layer are preheated through five heating zones, temperature of the five heating zones being as below: a first zone 190° C., a second zone 185° C., a third zone 170° C., a fourth zone 165° C., and a fifth zone 175° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product.

S4: moving the coextrusion layer semi-finished product at the speed of 0.5 m/min to be between a pair of oppositely-arranged pressing rollers for compression moulding. The temperature of the pressing rollers is 180° C., and the space between the pair of pressing rollers is 1.3 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Embodiment 2

A composite floor includes a wear-resistant layer, a printing film layer, a first stone-plastic layer, a stone-plastic foaming layer, and a second stone-plastic layer sequentially arranged from top to bottom. The first stone-plastic layer, the stone-plastic foaming layer, and the second stone-plastic layer are compression moulded using a coextrusion process. The first stone-plastic layer and the second stone-plastic layer are mainly made from following raw materials of parts by weight: polyvinyl chloride 70 parts by weight, calcium carbonate 150 parts by weight, calcium-zinc stabilizer 6 parts by weight, chlorinated polyethylene 6 parts by weight, stearic acid 0.5 parts by weight, acrylic resin 1 parts by weight, carbon black 0.3 parts by weight, and polyethylene wax 0.8 parts by weight. The stone-plastic foaming layer is mainly made from following raw materials of parts by weight: polyvinyl chloride 100 parts by weight, calcium carbonate 100 parts by weight, calcium-zinc stabilizer 3.5 parts by weight, internal lubricant for PVC 0.3 parts by weight, polyethylene wax 0.15 parts by weight, azodicarbonamide 0.2 parts by weight, nitroso-salt derivative 0.45 parts by weight, foam control agent 3 parts by weight, external lubricant for PVC 0.5 parts by weight, chlorinated polyethylene 2 parts by weight, styrene acrylic polymer 2.5 parts by weight, and high-density oxidized polyethlene wax 0.1 parts by weight.

The manufacturing method of the above composite floor includes following steps:

S1: respectively mixing the raw materials of the stone-plastic layer and the raw materials of the stone-plastic foaming layer, wherein the raw materials of the stone-plastic layer are mainly composed of following constituents of parts by weight: polyvinyl chloride 70 parts by weight, calcium carbonate 150 parts by weight, calcium-zinc stabilizer 6 parts by weight, chlorinated polyethylene 6 parts by weight, stearic acid 0.5 parts by weight, acrylic ester 1 parts by weight, carbon black 0.3 parts by weight, and polyethylene wax 0.8 parts by weight. The raw materials of the stone-plastic foaming layer are mainly composed of following constituents of parts by weight: polyvinyl chloride 100 parts by weight, calcium carbonate 100 parts by weight, calcium-zinc stabilizer 3.5 parts by weight, internal lubricant for PVC 0.3 parts by weight, polyethylene wax 0.15 parts by weight, azodicarbonamide 0.2 parts by weight, nitroso-salt derivative 0.45 parts by weight, foam control agent 3 parts by weight, external lubricant for PVC 0.5 parts by weight, chlorinated polyethylene 2 parts by weight, styrene acrylic polymer 2.5 parts by weight, and high-density oxidized polyethylene wax 0.1 parts by weight.

S2: preheating the mixed raw materials of the stone-plastic foaming layer through five heating zones, temperature of the five heating zones being as below: a first zone 191° C., a second zone 188° C., a third zone 172° C., a fourth zone 168° C., and a fifth zone 175° C. Simultaneously, the mixed raw materials of the stone-plastic layer are preheated through five heating zones, temperature of the five heating zones being as below: a first zone 191° C., a second zone 188° C., a third zone 172° C., a fourth zone 168° C., and a fifth zone 175° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product.

S4: moving the coextrusion layer semi-finished product at the speed of 1 m/min to be between a pair of oppositely-arranged pressing rollers for compression moulding. The temperature of the pressing rollers is 180° C., and the space between the pair of pressing rollers is 1.1 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Embodiment 3

A composite floor includes a wear-resistant layer, a printing film layer, a first stone-plastic layer, a stone-plastic foaming layer, and a second stone-plastic layer sequentially arranged from top to bottom. The first stone-plastic layer, the stone-plastic foaming layer, and the second stone-plastic layer are compression moulded using a coextrusion process. The first stone-plastic layer and the second stone-plastic layer are mainly made from following raw materials of parts by weight: polyvinyl chloride 75 parts by weight, calcium carbonate 140 parts by weight, calcium-zinc stabilizer 7 parts by weight, chlorinated polyethylene 5 parts by weight, stearic acid 0.4 parts by weight, acrylic resin 1.5 parts by weight, carbon black 0.35 parts by weight, and polyethylene wax 0.7 parts by weight. The stone-plastic foaming layer is mainly made from following raw materials of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.3 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 2.5 parts by weight, and high-density oxidized polyethlene wax 0.1 parts by weight.

The manufacturing method of the above composite floor includes following steps:

S1: respectively mixing the raw materials of the stone-plastic layer and the raw materials of the stone-plastic foaming layer, wherein the raw materials of the stone-plastic layer are mainly composed of following constituents of parts by weight: polyvinyl chloride 75 parts by weight, calcium carbonate 140 parts by weight, calcium-zinc stabilizer 7 parts by weight, chlorinated polyethylene 5 parts by weight, stearic acid 0.4 parts by weight, acrylic ester 1.5 parts by weight, carbon black 0.35 parts by weight, and polyethylene wax 0.7 parts by weight. The raw materials of the stone-plastic foaming layer are mainly composed of following constituents of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.3 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 2.5 parts by weight, and high-density oxidized polyethlene wax 0.1 parts by weight.

S2: preheating the mixed raw materials of the stone-plastic foaming layer through five heating zones, and temperature of the five heating zones being as below: a first zone 191° C., a second zone 188° C., a third zone 170° C., a fourth zone 165° C., and a fifth zone 175° C. Simultaneously, the mixed raw materials of the stone-plastic layer are preheated through five heating zones, temperature of the five heating zones being as below: a first zone 191° C., a second zone 188° C., a third zone 170° C., a fourth zone 165° C., and a fifth zone 175° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product.

S4: moving the coextrusion layer semi-finished product at the speed of 1.5 m/min to be between a pair of oppositely-arranged pressing rollers for compression moulding. The temperature of the pressing rollers is 180° C., and the space between the pair of pressing rollers is 0.7 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Embodiment 4

A composite floor includes a wear-resistant layer, a printing film layer, a first stone-plastic layer, a stone-plastic foaming layer, and a second stone-plastic layer sequentially arranged from top to bottom. The first stone-plastic layer, the stone-plastic foaming layer, and the second stone-plastic layer are compression moulded using a coextrusion process. The first stone-plastic layer and the second stone-plastic layer are mainly made from following raw materials of parts by weight: polyvinyl chloride 75 parts by weight, calcium carbonate 150 parts by weight, calcium-zinc stabilizer 7 parts by weight, chlorinated polyethylene 5 parts by weight, stearic acid 0.5 parts by weight, acrylic resin 1.5 parts by weight, carbon black 0.3 parts by weight, and polyethylene wax 0.7 parts by weight. The stone-plastic foaming layer is mainly made from following raw materials of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.2 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 3 parts by weight, and high-density oxidized polyethlene wax 0.15 parts by weight.

The manufacturing method of the above composite floor includes following steps:

S1: respectively mixing the raw materials of the stone-plastic layer and the raw materials of the stone-plastic foaming layer, wherein the raw materials of the stone-plastic layer are mainly composed of following constituents of parts by weight: polyvinyl chloride 75 parts by weight, calcium carbonate 150 parts by weight, calcium-zinc stabilizer 7 parts by weight, chlorinated polyethylene 5 parts by weight, stearic acid 0.5 parts by weight, acrylic ester 1.5 parts by weight, carbon black 0.3 parts by weight, and polyethylene wax 0.7 parts by weight. The raw materials of the stone-plastic foaming layer are mainly composed of following constituents of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.2 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 3 parts by weight, and high-density oxidized polyethlene wax 0.15 parts by weight.

S2: preheating the mixed raw materials of the stone-plastic foaming layer through five heating zones, and temperature of the five heating zones being as below: a first zone 191° C., a second zone 188° C., a third zone 170° C., a fourth zone 165° C., and a fifth zone 175° C. Simultaneously, the mixed raw materials of the stone-plastic layer are preheated through five heating zones, temperature of the five heating zones being as below: a first zone 191° C., a second zone 188° C., a third zone 170° C., a fourth zone 165° C., and a fifth zone 175° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product.

S4: moving the coextrusion layer semi-finished product at the speed of 1.5 m/min to be between a pair of oppositely-arranged pressing rollers for compression moulding. The temperature of the pressing rollers is 180° C., and the space between the pair of pressing rollers is 0.7 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Embodiment 5

A composite floor includes a wear-resistant layer, a printing film layer, a first stone-plastic layer, a stone-plastic foaming layer, and a second stone-plastic layer sequentially arranged from top to bottom. The first stone-plastic layer, the stone-plastic foaming layer, and the second stone-plastic layer are compression moulded using a coextrusion process. The first stone-plastic layer and the second stone-plastic layer are mainly made from following raw materials of parts by weight: polyvinyl chloride 80 parts by weight, calcium carbonate 160 parts by weight, calcium-zinc stabilizer 8 parts by weight, chlorinated polyethylene 6 parts by weight, stearic acid 0.65 parts by weight, acrylic resin 2 parts by weight, carbon black 0.35 parts by weight, and polyethylene wax 0.8 parts by weight. The stone-plastic foaming layer is mainly made from following raw materials of parts by weight: polyvinyl chloride 105 parts by weight, calcium carbonate 105 parts by weight, calcium-zinc stabilizer 3.5 parts by weight, internal lubricant for PVC 0.3 parts by weight, polyethylene wax 0.15 parts by weight, azodicarbonamide 0.3 parts by weight, nitroso-salt derivative 0.5 parts by weight, foam control agent 3.5 parts by weight, external lubricant for PVC 0.5 parts by weight, chlorinated polyethylene 2 parts by weight, styrene acrylic polymer 2.5 parts by weight, and high-density oxidized polyethlene wax 0.1 parts by weight.

The manufacturing method of the above composite floor includes following steps:

S1: respectively mixing the raw materials of the stone-plastic layer and the raw materials of the stone-plastic foaming layer, wherein the raw materials of the stone-plastic layer are mainly composed of following constituents of parts by weight: polyvinyl chloride 80 parts by weight, calcium carbonate 160 parts by weight, calcium-zinc stabilizer 8 parts by weight, chlorinated polyethylene 6 parts by weight, stearic acid 0.65 parts by weight, acrylic ester 2 parts by weight, carbon black 0.35 parts by weight, and polyethylene wax 0.8 parts by weight. The raw materials of the stone-plastic foaming layer are mainly composed of following constituents of parts by weight: polyvinyl chloride 105 parts by weight, calcium carbonate 105 parts by weight, calcium-zinc stabilizer 3.5 parts by weight, internal lubricant for PVC 0.3 parts by weight, polyethylene wax 0.15 parts by weight, azodicarbonamide 0.3 parts by weight, nitroso-salt derivative 0.5 parts by weight, foam control agent 3.5 parts by weight, external lubricant for PVC 0.5 parts by weight, chlorinated polyethylene 2 parts by weight, styrene acrylic polymer 2.5 parts by weight, and high-density oxidized polyethlene wax 0.1 parts by weight.

S2: preheating the mixed raw materials of the stone-plastic foaming layer through five heating zones, and temperature of the five heating zones being as below: a first zone 205° C., a second zone 200° C., a third zone 185° C., a fourth zone 170° C., and a fifth zone 180° C. Simultaneously, the mixed raw materials of the stone-plastic layer are preheated through five heating zones, temperature of the five heating zones being as below: a first zone 205° C., a second zone 200° C., a third zone 185° C., a fourth zone 170° C., and a fifth zone 180° C.

S3: extruding the preheated raw materials of the stone-plastic foaming layer into a layer, and extruding the preheated raw materials of the stone-plastic layer into two layers, namely the first stone-plastic layer and the second stone-plastic layer. The first stone-plastic layer is extruded on the stone-plastic foaming layer, and the second stone-plastic layer is extruded beneath the stone-plastic foaming layer. The first stone-plastic layer, the stone-plastic foaming layer and the second stone-plastic layer form a coextrusion layer semi-finished product.

S4: moving the coextrusion layer semi-finished product at the speed of 1.5 m/min to be between a pair of oppositely-arranged pressing rollers for compression moulding. The temperature of the pressing rollers is 190° C., and the space between the pair of pressing rollers is 1.0 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Comparative Example 1

Materials of various layers of the composite floor of Comparative Example 1 are the same as those of Embodiment 1. However, the compression moulding by the coextrusion process is not used. Each layer is respectively compression moulded, and then various layers are pasted by glue.

Comparative Example 2

A composite floor is prepared by using following methods.

S1: respectively mixing raw materials of a stone-plastic layer and raw materials of a stone-plastic center layer, wherein the raw materials of the stone-plastic layer are mainly composed of following constituents of parts by weight: polyvinyl chloride 60 parts by weight, calcium carbonate 130 parts by weight, calcium-zinc stabilizer 5 parts by weight, chlorinated polyethylene 3 parts by weight, stearic acid 0.3 parts by weight, acrylic ester 0.8 parts by weight, carbon black 0.2 parts by weight, and polyethylene wax 0.5 parts by weight. The raw materials of the stone-plastic center layer are mainly composed of following constituents of parts by weight: polyvinyl chloride 75 parts by weight, calcium carbonate 100 parts by weight, calcium-zinc stabilizer 4 parts by weight, internal lubricant for PVC 0.3 parts by weight, polyethylene wax 0.2 parts by weight, external lubricant for PVC 0.5 parts by weight, chlorinated polyethylene 2 parts by weight, styrene acrylic polymer 2.5 parts by weight, and high-density oxidized polyethlene wax 0.2 parts by weight.

S2: preheating the mixed raw materials of the stone-plastic center layer to 180° C. The mixed raw materials of the stone-plastic layer are preheated to 180° C.

S3: extruding the preheated raw materials of the stone-plastic center layer into a layer, and extruding the preheated raw materials of the stone-plastic layer into two layers, namely a first stone-plastic layer and a second stone-plastic layer. The first stone-plastic layer is extruded on the stone-plastic center layer, and the second stone-plastic layer is extruded beneath the stone-plastic center layer. The first stone-plastic layer, the stone-plastic center layer and the second stone-plastic layer form a coextrusion layer semi-finished product.

S4: moving the coextrusion layer semi-finished product at the speed of 1.5 m/min to be between a pair of oppositely-arranged pressing rollers for compression moulding. The temperature of the pressing rollers is 190° C., and the space between the pair of pressing rollers is 1.0 mm subtracted from the thickness of the coextrusion layer semi-finished product.

S5: sequentially applying the printing film layer and the wear-resistant layer onto the first stone-plastic layer, and obtaining the composite floor by pressing by pressing rollers.

Performance tests are carried out on the composite floors of Embodiments 1-5 and Comparative Examples 1 and 2. Density, hardness, shrinkage rate, and warpage of the composite floors are detected in accordance with Standard EN434, the detection results being as shown in Table 1 as below.

TABLE 1

|  | Density g/cm$^3$ | Hardness HD | Shrinkage rate | Warpage |
|---|---|---|---|---|
| Embodiment 1 | 1.75 | 65 | 0.11% | 1.3 mm |
| Embodiment 2 | 1.68 | 62 | 0.14% | 1.2 mm |
| Embodiment 3 | 1.78 | 68 | 0.08% | 1.0 mm |
| Embodiment 4 | 1.80 | 69 | 0.10% | 0.9 mm |
| Embodiment 5 | 1.80 | 67 | 0.12% | 1.2 mm |
| Comparative Example 1 | 1.95 | 70 | 0.15% | 1.5 mm |
| Comparative Example 2 | 1.50 | 55 | 0.16% | 1.6 mm |

As can be seen, by selecting the constituents and contents of the above embodiments for the stone-plastic layer, the manufactured composite floor is higher in hardness and stable in structure. By selecting the constituents and contents of the above embodiments for the stone-plastic foaming layer, the manufactured composite floor is small in shrinkage rate, small in warpage, good in high temperature resistance, stable in performance, and long in service life.

While the present invention has been disclosed by preferred embodiments, the preferred embodiments are not used to limit the present invention. Those skilled in the art should understand that, possible change and modification may be made on the technical solution of the present invention, without departing from the spirit and scope of the present invention, by using the methods and technical contents disclosed above. Therefore, any simple modifications, equivalent changes and improvements of the above embodiments, which are not departing from the content of the technical solution of the present invention, according to the technical concept of the present invention, are all within the scope of protection of the technical solution of the present invention.

What is claimed is:

1. A manufacturing method of a composite floor, comprising following steps:
    S1: respectively mixing raw materials of a stone-plastic layer and raw materials of a stone-plastic foaming layer;
    S2: preheating the mixed raw materials of the stone-plastic foaming layer through a plurality of heating zones, temperature of the plurality of heating zones being first reduced and then increased in sequence, a final temperature being 160-190° C.; and simultaneously preheating the mixed raw materials of the stone-plastic layer through a plurality of heating zones, temperature of the plurality of heating zones being first reduced and then increased in sequence, and a final temperature being 160-190° C.;
    S3: extruding the preheated raw materials of the stone-plastic foaming layer into a layer, and extruding the preheated raw materials of the stone-plastic layer into two layers, namely a first stone-plastic layer and a second stone-plastic layer, the first stone-plastic layer being extruded on the stone-plastic foaming layer, the second stone-plastic layer being extruded beneath the stone-plastic foaming layer, and the first stone-plastic layer, the stone-plastic foaming layer and the second stone-plastic layer forming a coextrusion layer semi-finished product; and
    S4: moving the coextrusion layer semi-finished product to be between a pair of oppositely-arranged pressing rollers for compression moulding, a temperature of the pressing rollers ranging from 180° C. to 210° C., and a space between the pair of pressing rollers being 0.7 mm-1.3 mm subtracted from a thickness of the coextrusion layer semi-finished product;
    wherein the preheating process of the raw materials of the stone-plastic foaming layer goes through five heating zones in sequence, temperature of the five heating zones being as below, respectively: a first zone 175-205° C., a second zone 170-205° C., a third zone 155-185° C., a fourth zone 150-180° C., and a fifth zone 160-190° C.; and the preheating process of the raw materials of the stone-plastic layer goes through five heating zones in sequence, temperature of the five heating zones being as below, respectively: a first zone 175-205° C., a second zone 170-205° C., a third zone 155-185° C., a fourth zone 150-180° C., and a fifth zone 160-190° C.

2. The manufacturing method of the composite floor according to claim 1, wherein a movement speed of the coextrusion layer semi-finished product ranges from 0.5 m/min to 1.5 m/min.

3. The manufacturing method of the composite floor according to claim 1, wherein the raw materials of the stone-plastic layer are mainly composed of following constituents of parts by weight: polyvinyl chloride (PVC) 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, polyethylene wax 0.6-0.8 parts by weight, and carbon black 0.25-0.35 parts by weight.

4. The manufacturing method of the composite floor according to claim 1, wherein the raw materials of the stone-plastic foaming layer are mainly composed of following constituents of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethylene wax 0.1-0.2 parts by weight.

5. The manufacturing method of the composite floor according to claim 1, wherein the first stone-plastic layer is mainly made from following raw materials of parts by weight: polyvinyl chloride 75 parts by weight, calcium carbonate 150 parts by weight, calcium-zinc stabilizer 7 parts by weight, chlorinated polyethylene 5 parts by weight, stearic acid 0.5 parts by weight, acrylic resin 1.5 parts by weight, carbon black 0.3 parts by weight, and polyethylene wax 0.7 parts by weight.

6. The manufacturing method of the composite floor according to claim 1, wherein the stone-plastic foaming layer is mainly made from following raw materials of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.2 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 3 parts by weight, and high-density oxidized polyethlene wax 0.15 parts by weight.

7. A composite floor manufactured by the method of claim 1, comprising a coextrusion layer compression moulded by using a coextrusion process, the coextrusion layer comprising a first stone-plastic layer, a stone-plastic foaming layer, and a second stone-plastic layer sequentially arranged from top to bottom.

8. The composite floor according to claim 7, wherein the first stone-plastic layer and the second stone-plastic layer are made from identical materials, the first stone-plastic layer is mainly made from following raw materials of parts by weight: polyvinyl chloride (PVC) 70-80 parts by weight, calcium carbonate 140-160 parts by weight, calcium-zinc stabilizer 6-8 parts by weight, chlorinated polyethylene 4-6 parts by weight, stearic acid 0.35-0.65 parts by weight, acrylic resin 1-2 parts by weight, polyethylene wax 0.6-0.8 parts by weight, and carbon black 0.25-0.35 parts by weight.

9. The composite floor according to claim 8, wherein the first stone-plastic layer is mainly made from following raw materials of parts by weight: polyvinyl chloride 75 parts by weight, calcium carbonate 150 parts by weight, calcium-zinc stabilizer 7 parts by weight, chlorinated polyethylene 5 parts by weight, stearic acid 0.5 parts by weight, acrylic resin 1.5 parts by weight, carbon black 0.3 parts by weight, and polyethylene wax 0.7 parts by weight.

10. The composite floor according to claim 7, wherein the stone-plastic foaming layer is mainly made from following raw materials of parts by weight: polyvinyl chloride 95-105 parts by weight, calcium carbonate 95-105 parts by weight, calcium-zinc stabilizer 3-5 parts by weight, internal lubricant for PVC 0.3-0.45 parts by weight, polyethylene wax 0.15-0.25 parts by weight, azodicarbonamide 0.15-0.25 parts by weight, nitroso-salt derivative 0.45-0.55 parts by weight, foam control agent 3-5 parts by weight, external lubricant for PVC 0.5-1.5 parts by weight, chlorinated polyethylene 2-3 parts by weight, styrene acrylic polymer 2.5-3.5 parts by weight, and high-density oxidized polyethlene wax 0.1-0.2 parts by weight.

11. The composite floor according to claim 10, wherein the stone-plastic foaming layer is mainly made from following raw materials of parts by weight: polyvinyl chloride 100 parts by weight, calcium carbonate 100 parts by weight, calcium-zinc stabilizer 4 parts by weight, internal lubricant for PVC 0.35 parts by weight, polyethylene wax 0.2 parts by weight, azodicarbonamide 0.2 parts by weight, nitroso-salt derivative 0.5 parts by weight, foam control agent 4 parts by weight, external lubricant for PVC 1 parts by weight, chlorinated polyethylene 2.5 parts by weight, styrene acrylic polymer 3 parts by weight, and high-density oxidized polyethlene wax 0.15 parts by weight.

* * * * *